United States Patent [19]

Salahshour et al.

[11] Patent Number: 5,577,125
[45] Date of Patent: Nov. 19, 1996

[54] GRAPHICAL MANIPULATION OF ENCRYPTION

[75] Inventors: Abdolreza Salahshour, Keller; Marvin L. Williams, Lewisville, both of Tex.

[73] Assignee: International Business Machines Corporation, Armonk, N.Y.

[21] Appl. No.: 77,172

[22] Filed: Jun. 14, 1993

[51] Int. Cl.$^6$ .......................................... H04L 9/00
[52] U.S. Cl. .............................. 380/54; 380/25; 380/44
[58] Field of Search .................................... 380/25, 54, 44

[56] References Cited

U.S. PATENT DOCUMENTS 4,780,905  10/1988  Cruts et al. ............................. 380/44
5,073,933  12/1991  Rosenthal ............................... 380/25

OTHER PUBLICATIONS

W. P. Graham and J. M. VanBuren "Data Protection at the Volume Level" IBM Technical Disclosure Bulletin, vol. 31, No. 5, pp. 146–148, published Oct., 1988.
M. F. Jones and R. E. Lennon "Cryptographic Key Distribution Method" IBM Technical Disclosure Bulletin, vol. 29, No. 2, pp. 580–582, published Jul., 1986.
C. H. Bennett and G. Brassard "Quantum Public Key Distribution System" IBM Technical Disclosure Bulletin, vol. 28, No. 7, pp. 3153–3163, published Dec., 1985.
D. R. Hicks and L. W. Loen "Encryption Method for Providing Tagged Storage" IBM Technical Disclosure Bulletin, vol. 26, No. 12, pp. 6530–6536, published May, 1984.
PC Magazine (Apr. 13, 1993) pp. 119 and 116, "Hard Disk Compression", Barr.
PKZIP Manual (1989–1992) pp. 68–74.

*Primary Examiner*—Salvatore Cangialosi
*Attorney, Agent, or Firm*—Norman L. Gundel

[57] ABSTRACT

A method and apparatus for graphical manipulation of encryption. In one embodiment, the invention provides an encryption work area window within a graphical user interface. A user may encrypt an unencrypted object by dropping an icon associated with the unencrypted object on the encryption work area. An encrypted object located within the encryption work area is decrypted when opened and encrypted when closed. An encrypted object located within the encryption work area is decrypted if it is dragged and dropped outside the encryption work area and decryption is selected; alternatively, the encryption of the encrypted object is maintained if it is dragged and dropped outside the work area and maintain encryption is selected.

12 Claims, 4 Drawing Sheets

GRAPHICAL MANIPULATION OF ENCRYPTION

BACKGROUND OF THE INVENTION

Field of the Invention

The present invention relates to data processing systems and in particular to data processing systems that provide graphical user interfaces that permit direct manipulation operations.

Description of the Related Art

A data processing system may permit the encryption of files or objects resident in the data processing system. Known encryption methods may utilize a sequence of symbols, called a key or a cryptographic key, with a cryptographic algorithm to encrypt or decrypt data. Various cryptographic algorithms use the same key for both encryption and decryption, while other cryptographic algorithms use separate keys for encryption and for decryption. Encryption of files enhances data processing security; however, it is cumbersome as an encrypted file must be decrypted before the contents of the file can be accessed or utilized by the data processing system.

A user interface is desired that renders the encryption and decryption of files and objects unintrusive to the user and permits encrypted files and objects to be manipulated, encrypted, decrypted and accessed by the data processing system with a minimum of user involvement beyond that required for unencrypted files and objects.

SUMMARY OF THE INVENTION

In accordance with the invention, a method and apparatus are provided for graphical manipulation of encryption. In one embodiment, the invention provides an encryption work area window within a graphical user interface. A user may encrypt an unencrypted object by dropping an icon associated with the unencrypted object on the encryption work area. An encrypted object located within the encryption work area is decrypted when opened and encrypted when closed. An encrypted object located within the encryption work area is decrypted if it is dragged and dropped outside the encryption work area and decryption is selected; alternatively, the encryption of the encrypted object is maintained if it is dragged and dropped outside the work area and maintain encryption is selected.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
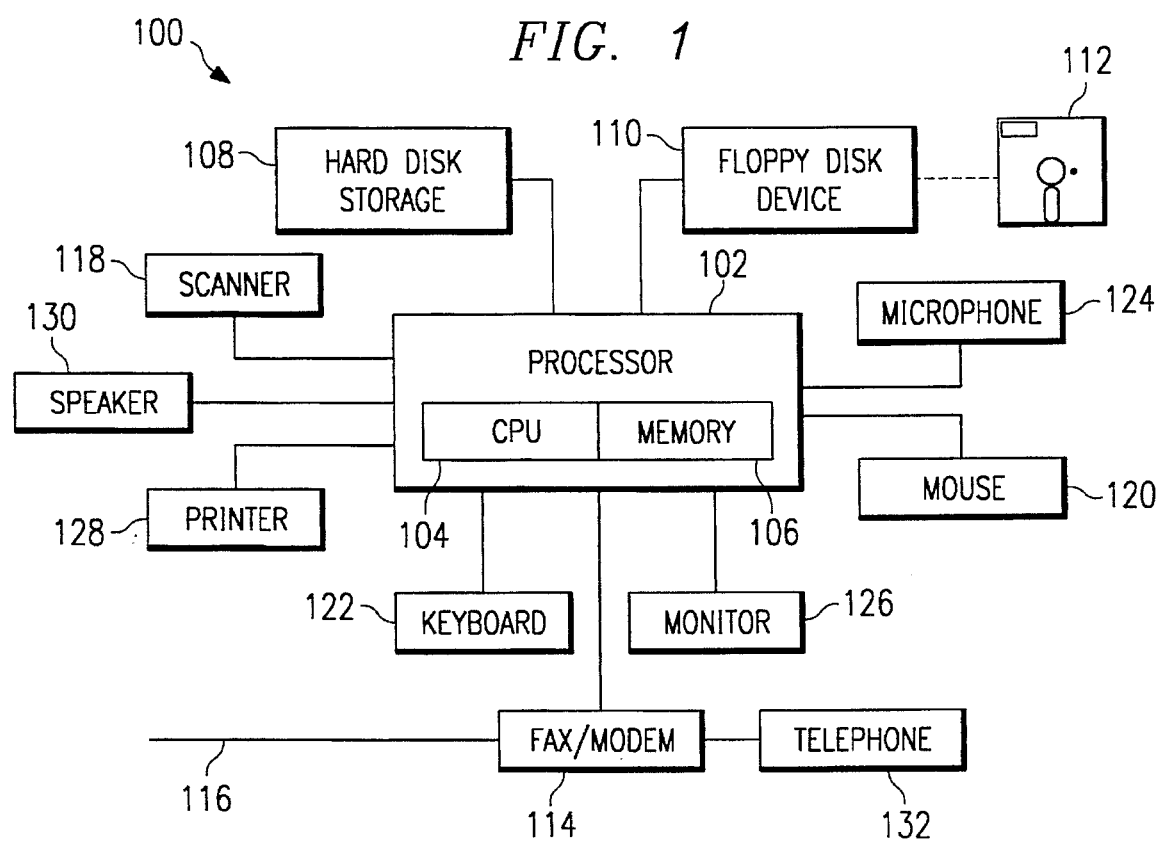
FIG. 1 is a block diagram of an apparatus used in performing the method of a preferred embodiment of the present invention and forming a part of the apparatus of a preferred embodiment of the present invention.

With reference now to the Figures, and in particular with reference to FIG. 1, there is shown, in block diagram form, an apparatus according to the present invention. The apparatus includes a data processing system 100. Data processing system 100 may be a preferred IBM PS/2 (trademarks of IBM Corp.) computer configured as described herein. The data processing system 100 includes a processor 102, which includes a central processing unit (CPU) 104 and memory 106. Additional storage, such as a hard disk file storage 108 and a floppy disk device 110 may be connected to the processor 102. Floppy disk device 110 may write to or read from a removable diskette 112 which may have computer program code recorded thereon that implements portions of the present invention in the data processing system 100. Inputs may also be received from a fax/modem 114, which is connected to a telephone line 116, and from a scanner 118. The data processing system 100 also includes user interface hardware, such as a pointing device such as mouse 120, a keyboard 122 and a microphone 124, for allowing user input to the processor 102. The data processing system 100 also includes a visual display device, such as a monochrome or color display monitor 126 and a monochrome or color display printer 128, for rendering visual information. The data processing system may also include an audio display device, such as a speaker 130 for rendering audio information. A telephone 132 may be connected to the telephone line 116 through the fax/modem 114. The data processing system 100 includes an operating system such as the preferred IBM OS/2 and a graphical user interface such as the preferred OS/2 Presentation Manager and the preferred IBM Workplace Shell (trademarks of IBM Corp.).

Figure 2:
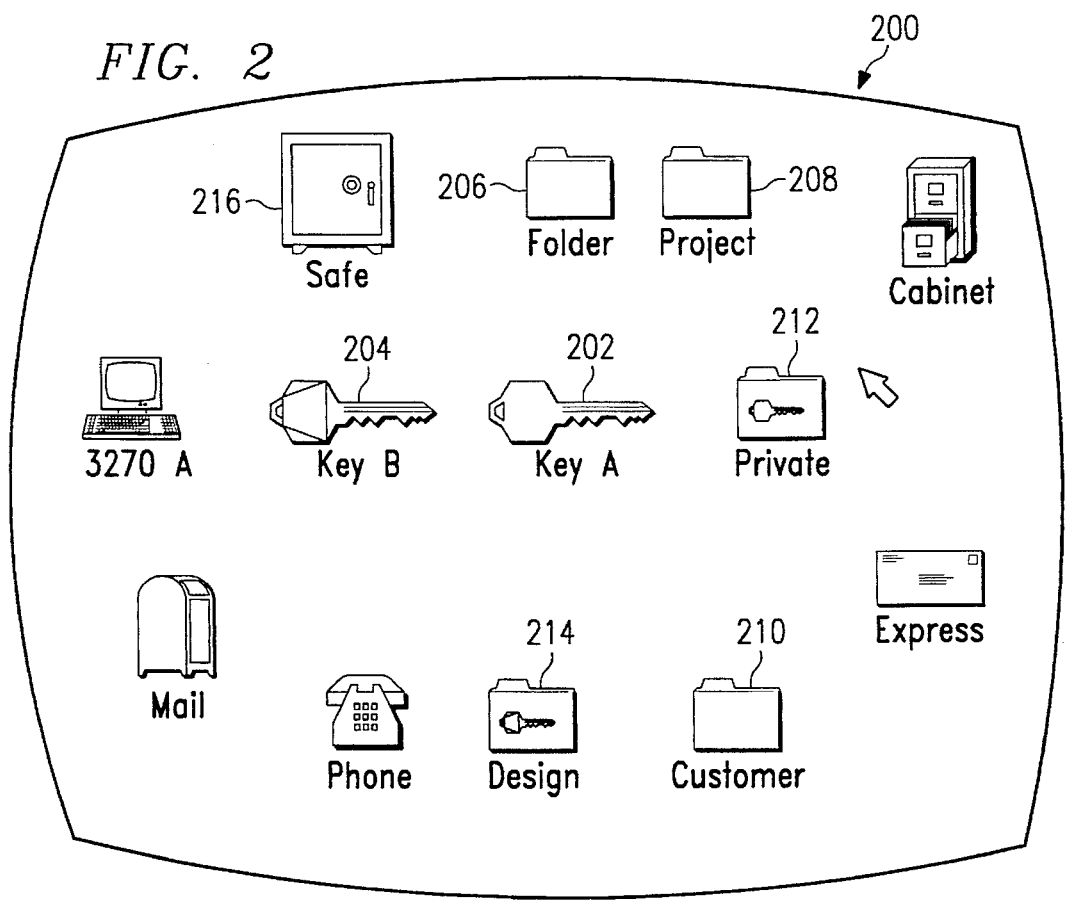
FIGS. 2 and 3 illustrate a desktop of a graphical user interface capable of direct manipulation operations by which graphical manipulation of encryption may be practiced.
Figure 3:
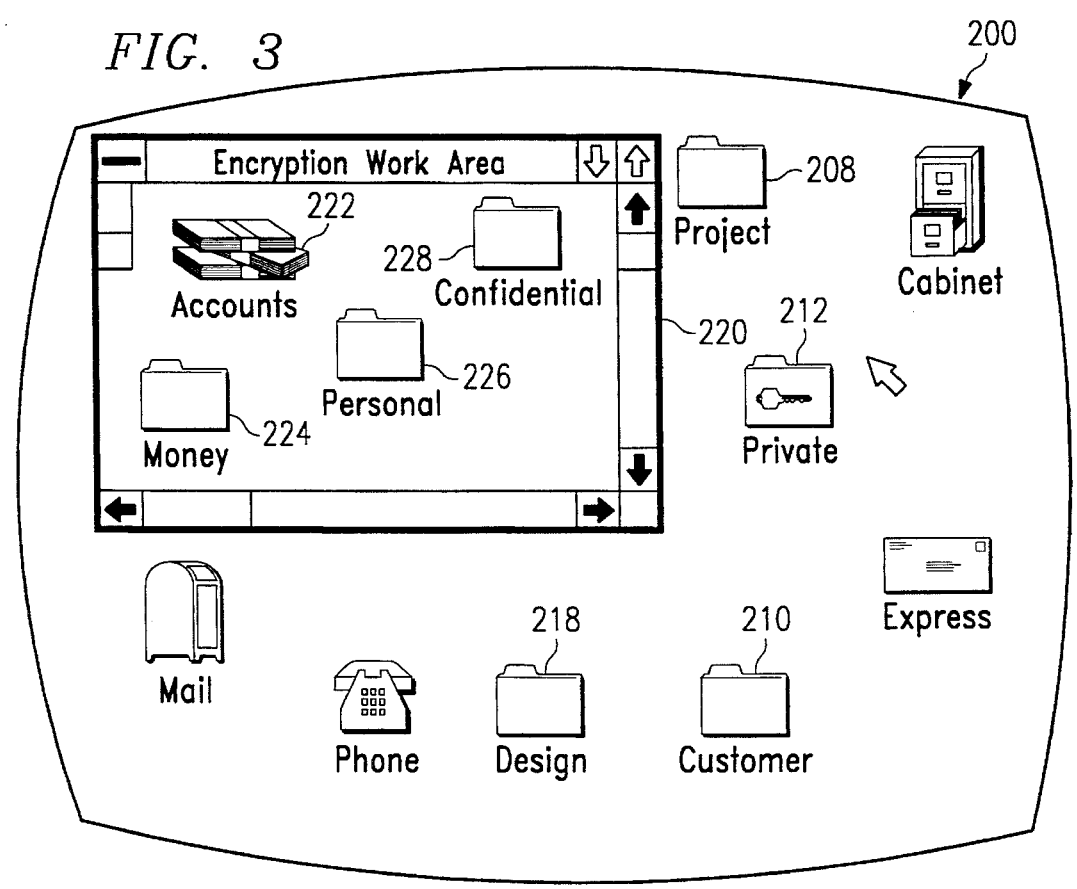

With reference now to FIGS. 2 and 3, there is depicted two views of a desktop 200 of the graphical user interface of the data processing system 100 as the desktop may be displayed to the user on a visual display device such as color display monitor 126 of FIG. 1. In FIG. 2, desktop 200 displays various icons, including two encryption work area icons 202 and 204. Each of these two icons is associated with a separate encryption work area window. Each separate encryption work area is a graphical user interface window that functions and interacts with a user in the same manner as other windows of the graphical user interface, except as described herein. Objects within the encryption work area can be accessed or manipulated in the same manner as unencrypted objects may be elsewhere in the graphical user interface. The encryption work area functions as an area for automatically encrypting objects moved into it and for automatically decrypting objects within it that are opened or accessed by the user or the data processing system or are moved out of it, as transparently to the user as possible.

The invention may be practiced with multiple encryption work areas, as shown in FIG. 2, or with a single encryption work area. FIG. 3 shows an encryption work area window in an open state.

Each separate encryption work area includes a preferably unique encryption key which is used to encrypt files and objects using a known encryption algorithm such as may be specified by the Data Encryption Standard (DES), Publication No. 46. For decryption, a known decryption algorithm as specified therein may also be used with a decryption key. Where multiple encryption work areas are provided, an object that has been encrypted by a first encryption work area may subsequently be encrypted again by a second encryption work area; since the object has not been previously encrypted by the encryption key associated with the second encryption work area, the second encryption work area treats the object as an unencrypted object.

Preferably, an encryption work area template is provided. An encryption work area window may be created by dragging an encryption work area template from the template container and entering an encryption key. The encryption key may be subsequently replaced with a different encryption key. The preferred embodiment of the invention described herein uses separate, nonidentical encryption and decryption keys, although the invention also contemplates the use of a single encryption-decryption key.

Other icons are also displayed to the user on the desktop, including folder icons 206, 208, 210, 212 and 214 and safe icon 216. Folder icons 206, 208 and 210 represent container objects. Folder icons 212 and 214 also represent container objects; however the containers represented by icons 212 and 214 are encrypted, as is visually indicated to the user by the encryption key overlay appearing on each of folder icons 212 and 214. Safe icon 216 is also a container object which the user may open only by providing a password.

With reference now to FIG. 3, desktop 200 is shown with folder icons 208 and 210 and encrypted folder icon 212 visible. The desktop 200 also displays an open encryption work area 220. Encryption work area 220 is a window and, except as described herein, operates generally as any window displayed on the desktop by the graphical user interface. The user may initiate the opening of encryption work area 220 in any known manner, as by double clicking on icon 204. Encryption work area 220 will respond with a dialog box in which the user may enter a decryption key. Encryption work area 220 may be configured to open only upon entry of the correct decryption key, or alternatively, upon the entry of any decryption key or no key at all. Any decryption key entered will be retained by the encryption work area 220 until it is subsequently closed. Icon 202 remains on the desktop 200, but is concealed from the user's view in FIG. 3 by encryption work area 220.

The invention allows the use of direct manipulation techniques to encrypt and decrypt objects such as containers or program or data files. Icons may be dragged into the encryption work area 220. For example, folder icon 218 of FIG. 3 may be dragged into encryption work area 220, which will cause the icon 218 to be displayed inside the encryption work area 220 and will also cause the object represented by folder icon 218 to be encrypted using an encryption algorithm with the encryption key associated with the encryption work area 220. Icons 222, 224, 226, and 228, all of which appear within encryption work area 220, represent objects encrypted with the encryption key associated with encryption work area 220. Similarly, icons may be dragged out of encryption work area 220. Preferably, an icon dragged out of encryption work area 220 maintains its encryption. It may be displayed where dropped on the desktop with an encryption key overlay appearing on the icon. An icon dragged out of the encryption work area while using an augmentation key may be decrypted. If the correct decryption key was supplied when the encryption work area was opened, the object represented by the icon may be decrypted without further user intervention, and the icon will be displayed where dropped on the desktop without the encryption symbol overlay. If the correct decryption key was not supplied earlier, a dialog box will allow entry of the decryption key and the object will be decrypted if the correct decryption key is entered.

When an object represented by an icon in an open encryption work area 220, such as icon 222 of FIG. 3, is opened, the object represented by the icon is automatically decrypted, using the decryption algorithm with the decryption key supplied when the encryption work area 220 was opened. The object may be accessed by the data processing system 100 so long as the object remains open. The object will be encrypted using the encryption key associated with encryption work area 220 if its icon remains in the encryption work area 220 when the object is closed. If the correct decryption key was not supplied when the encryption work area 220 was opened, opening an object within the encryption work area 220 will cause the object to be decrypted if the correct decryption key is supplied, as by a dialog box. Similarly, an object represented by an icon outside an encryption work area 220, such as icon 214 of FIG. 2, may be decrypted when opened if the correct decryption key is supplied.

Returning now to FIG. 2, an object on the desktop 200 may also be moved into an encryption work area by dragging and dropping the object, such as icon 210 or icon 214, onto an encryption work area icon, such as icon 204. If the object is already encrypted, such as the object associated with icon 214, the icon will merely be relocated into the encryption work area 220. However, if the object is not encrypted, such as the object associated with icon 210, icon 210 will not only be relocated into the encryption work area but the associated object will also be encrypted. The same results may also be achieved by dropping the encryption icon 204 onto icon 210 or 214.

A password protected container such as safe 216 may optionally be provided. Safe 216 is a password protected container. The user must supply the proper password before safe 216 can be opened, but safe 216 otherwise functions as a container. Placing encryption key icon 204 into safe 216 prevents direct manipulation operations involving the encryption key icon 204 unless the safe 216 is first opened with the proper password. Alternatively, encryption key icon 204 may require that a password be supplied before certain direct manipulation operations may be permitted.

Figure 4:
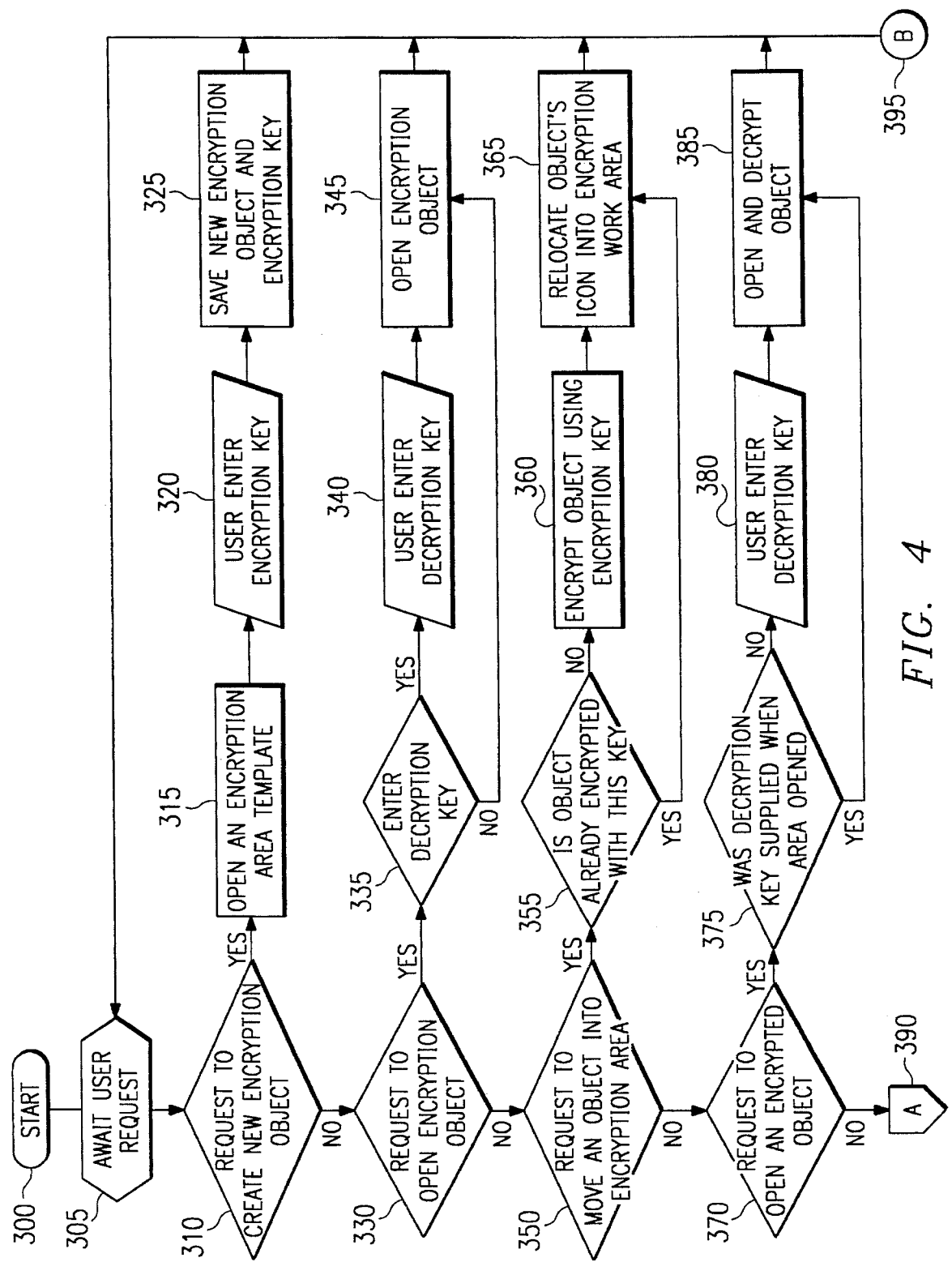
FIGS. 4 and 5 are a high level logic flowchart illustrating the method of a preferred embodiment of the process for graphical manipulation of encryption.
Figure 5:
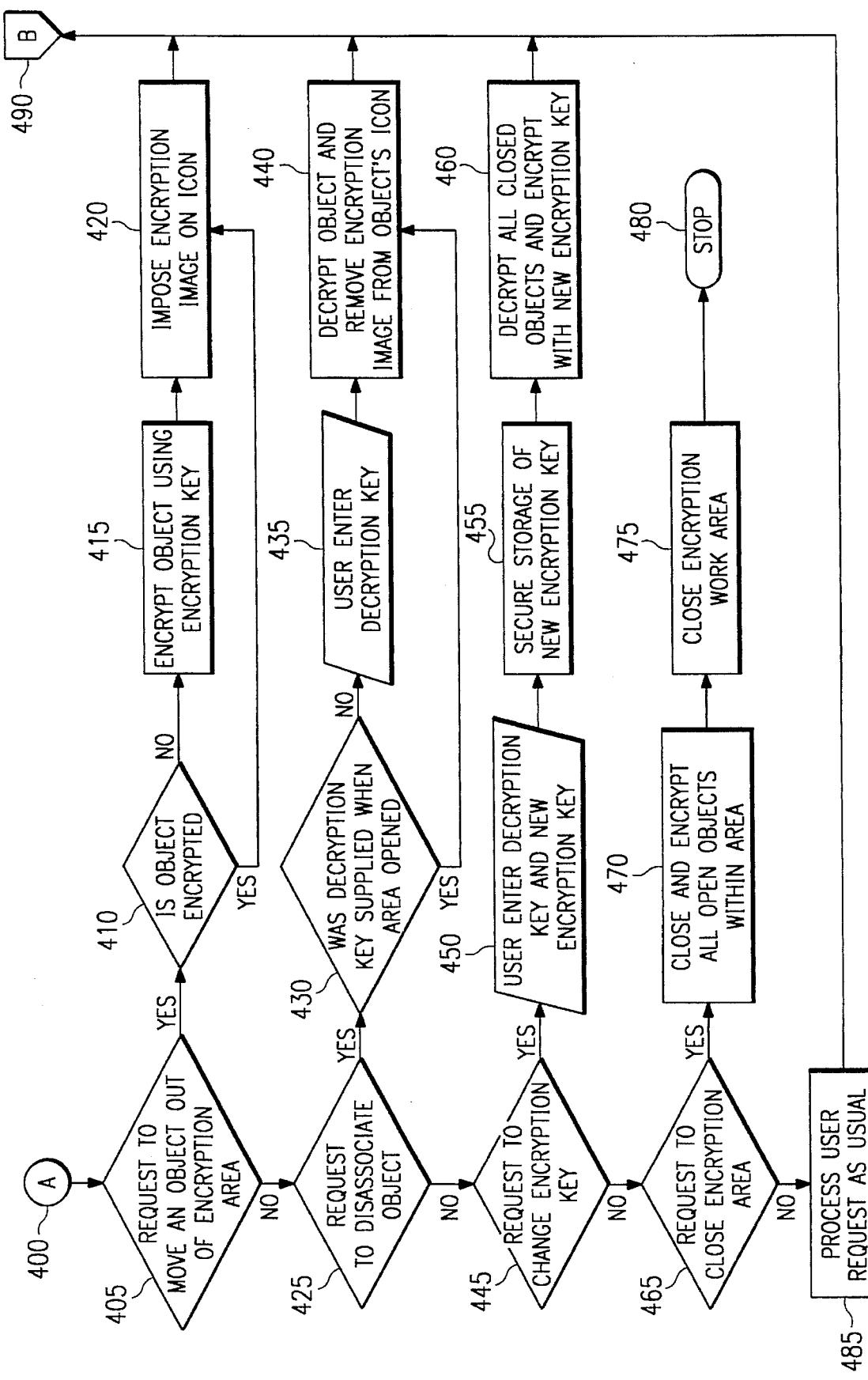

With reference now to FIGS. 4 and 5, there is depicted a high level logic flowchart which illustrates the method of a preferred embodiment of the present invention for graphical manipulation of encryption. The process commences at block 300 and proceeds to block 305 to await the receipt of an encryption-decryption associated user request. Upon receipt of a user request, the process proceeds to block 310 for a determination of whether the request received is a request to create a new encryption work area object. Such a request may be received by dragging a encryption work area template from the templates container to the desktop. If the request is to create a new encryption work area, the process proceeds to block 315 and opens a new encryption work area template. The process then proceeds to block 320 for user input of an encryption key. The process then proceeds to block 325 and associates the new encryption key with the template and saves the template to the desktop as a new encryption work area object and icon. The process then proceeds to block 305 to await further user input.

Returning to block 310, if the request received is not a request to create a new encryption work area object, the process proceeds to block 330. In block 330, the process determines whether the request received is a request to open an encryption object. Such a request may be received by double clicking on an icon associated with an encryption work area, such as icon 204 of FIG. 2. If the request received is a request to open an encryption object, the process proceeds to block 335 for a determination of whether the user will supply a decryption key. If yes, the process proceeds to block 340 and displays a dialog box for the entry of a decryption key. Upon receipt of the decryption key, the process proceeds to block 345 and opens the encryption work area object, associating the supplied decryption key therewith. The user may configure whether the encryption work area will encrypt the titles or icons of objects contained therein. If titles and icons are encrypted and the correct decryption key is not provided, the system may be configured not to display the titles or icons. Returning to block 335, if it is determined that the user will not supply a decryption key, the process proceeds from block 335 to block 345 and opens the encryption work area object without associating a decryption key. From block 345, the process returns to block 305 to await the next user request.

Returning to block 330, if the request received is not a request to open an encryption object, the process proceeds to block 350. In block 350, the process determines whether the request is a request to move an object into the encryption area. Such a request may be received by dragging an icon into an open encryption work area, by dropping an icon onto an encryption icon, or by dropping an encryption icon onto an object. If the request is to move an object into an encryption area, the process proceeds to block 355 for a determination of whether the object has already been encrypted with the encryption key of the target encryption work area, like the object associated with icon 214. If no, the process proceeds to block 360 and encrypts the object using the encryption key associated with the target encryption work area and then proceeds to block 365. Returning to block 355, if the object has been encrypted with the encryption key of the target encryption work area, like the object associated with icon 210, the process proceeds directly to block 365. In block 365, the icon associated with the object is relocated into the encryption work area. The process then proceeds from block 365 to block 305 to await the next user request.

Returning to block 350, if the request received is not a request to move an object into an encryption area, the process proceeds to block 370. In block 370, the process determines whether the request is a request to open an encrypted object. The encrypted object may be located either in an open encryption work area or elsewhere. Such a request may be received by double clicking on the icon associated with the encrypted object. If the request received is a request to open an encrypted icon, the process proceeds from block 370 to block 375 for a determination of whether the object is located in an open encryption work area which was supplied with a decryption key when it was opened, as discussed above in connection with blocks 330 to 345. If no decryption key was previously supplied, or if the object is not located in an encryption work area, the process proceeds to block 380 and provides a dialog box for the user to supply the decryption key. When the decryption key is supplied, the process proceeds from block 380 to block 385. Returning to block 375, if the decryption key was previously supplied, the process proceeds directly from block 375 to block 385. In block 385, the object is opened and decrypted using the decryption key. The process then proceeds from block 385 to block 305 to await the next user request.

Returning to block 370, if the request received is not a request to open an encrypted object, the process proceeds to off page connector 390 and thence to connector 400 of FIG. 5 and thence to block 405. In block 405, the process determines whether the request is a request to move an object out of the encryption area. Such a request may be received by dragging an icon associated with an object out of an open encryption work area. If the request received is a request to move an object out of the encryption area, the process proceeds from block 405 to block 410 for a determination of whether the object is encrypted. Closed objects located in the encryption work area are normally encrypted, while open objects located in the encryption work area are normally not encrypted. If the object is not encrypted, the process proceeds from block 410 to block 415 where the object is encrypted using the encryption key associated with the encryption work area. The process then proceeds to block 420. Returning to block 410, if the object in the encryption work area is already encrypted, the process proceeds directly from block 410 to block 420. In block 420, the process imposes an encryption image on the icon, such as the encryption key symbol shown on icon 214 of FIG. 2, and relocates the icon to the location where it is dropped. The process then proceeds from block 420 to off page connector 490 and thence to connector 395 of FIG. 4 and thence to block 305 to await the next user request.

Returning to block 405, if the request received is not a request to move an object out of the encryption area, the process proceeds to block 425. In block 425, the process determines whether the request is a request to disassociate an object from the encryption area. Such a request may be received by dragging an icon associated with an object out of an open encryption work area while depressing an augmentation key such as "Ctrl," or by menu selection after clicking on an icon that has a visible encryption indication on it and is located outside the encryption work area 220. If the request received is a request to disassociate an object from an encryption work area, and the object is located within an open encryption work area, the process proceeds from block 425 to block 430 for a determination of whether the decryption key was supplied when the encryption work area was opened, as described above in connection with blocks 330 through 345 of FIG. 4. If no decryption key was previously supplied, the process proceeds to block 435 and provides a dialog box for the user to supply the decryption key. When the decryption key is supplied, the process proceeds from block 435 to block 440. Returning to block 430, if the decryption key was previously supplied, the process proceeds directly from block 430 to block 440. In block 440, the encryption image is removed from the object's icon, the object is opened and decrypted using the decryption algorithm and the decryption key, and closed and relocated to the location where it is dropped. The process then proceeds from block 440 to off page connector 490 and thence to connector 395 of FIG. 4 and thence to block 305 to await the next user request.

Returning to block 425, if the request received is not a request to disassociate an object from the encryption area, the process proceeds to block 445. In block 445, the process determines whether the request is a request to change the encryption key. Such a request may be made by menu selection. If the request received is a request to change the encryption key, the process proceeds from block 445 to block 450 and provides a dialog box for the user to supply the new encryption key and also the old decryption key if it was not earlier supplied upon opening the encryption work area. When both keys are supplied, the process proceeds from block 450 to block 455 and stores the new encryption key in non-volatile storage 108 or 112 in association with the encryption work area. The process then proceeds to block 460 and decrypts all closed objects in the encryption work area with the decryption algorithm and the old decryption key and encrypts each such object with the encryption algorithm and the new encryption key. The process then proceeds from block 460 to off page connector 490 and thence to connector 395 of FIG. 4 and thence to block 305 to await the next user request.

Returning to block 445, if the request received is not a request to change the encryption key, the process proceeds to block 465. In block 465, the process determines whether the request is a request to close the encryption work area. Such a request may be made by double clicking on the system menu icon of the open encryption work area window. If the request received is a request to close the encryption work area, the process proceeds from block 465 to block 470 and closes and encrypts all open objects within the encryption work area using the encryption algorithm with the encryption key associated with the encryption work area. The process then proceeds to block 475 and closes the encryption work area window. The process then proceeds to block 480 and terminates.

Returning to block 465, if the request received is not a request to close the encryption work area, the process proceeds to block 485 and processes the non-encryption-related user request as usual. The process then proceeds from block 485 to off page connector 490 and thence to connector 395 of FIG. 4 and thence to block 305 to await the next user request.

Upon reference to the foregoing, it will be appreciated that the applicants have provided a novel and useful method and apparatus for graphical manipulation of encryption. While the invention has been particularly shown and described with reference to a preferred embodiment and process, it will be understood that various changes in form and detail may be made therein without departing from the spirit and scope of the invention.

What is claimed is:

1. A method, performed in a data processing system, said data processing system including an encryption work area, said encryption work area having an encryption key and a decryption key associated therewith, the method comprising the computer implemented steps of:

encrypting an unencrypted object with the encryption key, said unencrypted object being associated with an icon located outside the encryption work area, and displaying the icon in the encryption work area, whenever the icon associated with the unencrypted object is dragged from outside the encryption work area and dropped on the encryption work area;

decrypting an encrypted object with the decryption key, said encrypted object being associated with an icon located within the encryption work area, whenever the encrypted object is opened;

encrypting, with the encryption key, an open unencrypted object associated with the encryption work area whenever the open unencrypted object is closed;

decrypting an encrypted object with the decryption key, said encrypted object being associated with an icon located within the encryption work area, and displaying the icon associated with the encrypted object outside the encryption work area, whenever the icon associated with the encrypted object is dragged from the encryption work area and dropped outside the encryption work area and decryption is selected and the decryption key is provided;

maintaining the encryption of an encrypted object, said encrypted object being associated with an icon located within the encryption work area, and displaying the icon associated with the encrypted object outside the encryption work area, whenever the icon associated with the encrypted object is dragged from the encryption work area and dropped outside the encryption work area and maintaining encryption is selected; and decrypting an encrypted object with the decryption key, said encrypted object being associated with an icon located outside the encryption work area, whenever the encrypted object is opened and the decryption key is provided.

2. The method of claim 1, wherein an unencrypted object includes an object encrypted with an encryption key that is not identical to the encryption key associated with the encryption work area.

3. The method of claim 1, wherein at least one of the selections of decrypting an encrypted object and maintaining the encryption of an encrypted object is selectable through the use of an augmentation key during a drag and drop operation.

4. The method of claim 1, wherein one of the selections of decrypting an encrypted object and maintaining the encryption of an encrypted object is a default selection.

5. The method of claim 1, wherein the icon that is associated with an encrypted object and that is also located outside the encryption work area includes a visible indication that the encrypted object is encrypted.

6. The method of claim 1, further comprising the computer implemented step of encrypting an unencrypted object with the encryption key whenever an icon associated with the encryption work area is dropped on an icon associated with the unencrypted object.

7. A data processing system, comprising:

an encryption work area displayed by the data processing system, said encryption work area having an encryption key and a decryption key associated therewith;

means for encrypting an unencrypted object with the encryption key, said unencrypted object being associated with an icon located outside the encryption work area, and for displaying the icon in the encryption work area, whenever the icon associated with the unencrypted object is dragged from outside the encryption work area and dropped on the encryption work area;

means for decrypting an encrypted object with the decryption key, said encrypted object being associated with an icon located within the encryption work area, whenever the encrypted object is opened;

means for encrypting, with the encryption key, an open unencrypted object associated with the encryption work area whenever the open unencrypted object is closed;

means for decrypting an encrypted object with the decryption key, said encrypted object being associated with an icon located within the encryption work area, and for displaying the icon associated with the encrypted object outside the encryption work area, whenever the icon associated with the encrypted object is dragged from the encryption work area and dropped outside the encryption work area and decryption is selected and the decryption key is provided;

means for maintaining the encryption of an encrypted object, said encrypted object being associated with an icon located within the encryption work area, and for displaying the icon associated with the encrypted object outside the encryption work area, whenever the icon associated with the encrypted object is dragged from the encryption work area and dropped outside the encryption work area and maintaining encryption is selected; and means for decrypting an encrypted object with the decryption key, said encrypted object being associated with an icon located outside the encryption work area, whenever the encrypted object is opened and the decryption key is provided.

8. The data processing system of claim 7, wherein an unencrypted object includes an object encrypted with an encryption key that is not identical to the encryption key associated with the encryption work area.

9. The data processing system of claim 7, wherein at least one of the selections of decrypting an encrypted object and maintaining the encryption of an encrypted object is selectable through the use of an augmentation key during a drag and drop operation.

10. The data processing system of claim 7, wherein one of the selections of decrypting an encrypted object and maintaining the encryption of an encrypted object is a default selection.

11. The data processing system of claim 7, wherein the icon that is associated with an encrypted object and that is also located outside the encryption work area includes a visible indication that the encrypted object is encrypted.

12. The data processing system of claim 7, further comprising means for encrypting an unencrypted object with the encryption key whenever an icon associated with the encryption work area is dropped on an icon associated with the unencrypted object.

* * * * *